United States Patent [19]
Schimke

[11] Patent Number: 6,059,047
[45] Date of Patent: May 9, 2000

[54] FARM LAND SEED BOOT

[76] Inventor: Harvey J. Schimke, R.R. #4, Red Deer, Alberta, Canada, T4N 5E4

[21] Appl. No.: 09/124,573

[22] Filed: Jul. 29, 1998

Related U.S. Application Data

[60] Provisional application No. 60/055,940, Aug. 18, 1997.

[51] Int. Cl.[7] .................................................. A01B 15/00
[52] U.S. Cl. ........................... 172/769; 111/200; 172/772
[58] Field of Search ..................... 172/772, 772.5, 172/753, 762, 763, 769; 111/150, 149, 152, 14, 186, 200

[56] References Cited

U.S. PATENT DOCUMENTS

| | | | |
|---|---|---|---|
| 4,446,801 | 5/1984 | Machnee et al. | 111/150 X |
| 4,546,276 | 10/1985 | Linger | 172/772.5 X |
| 4,653,412 | 3/1987 | Clarke | 111/150 |
| 4,669,922 | 6/1987 | Hooper et al. | 111/150 X |
| 4,799,823 | 1/1989 | William | 172/772 X |
| 4,932,478 | 6/1990 | Jones | 172/772 X |
| 5,325,799 | 7/1994 | Rowlett | 172/772 X |
| 5,415,236 | 5/1995 | Williams | 172/772 X |

*Primary Examiner*—Victor Batson
*Attorney, Agent, or Firm*—Dennis T. Griggs

[57] ABSTRACT

A seed boot in the form of a single steel casting is provided. The seed boot comprises a front bracket, seed boot member and rear bracket. The front bracket is adapted to bolt at its upper end to an edge-on cultivator shank and to a sweep at its other end. The rear bracket is adapted to bolt to and support a knife and fertilizer boot.

4 Claims, 4 Drawing Sheets

FARM LAND SEED BOOT

This application claims benefit of Provisional Appl. No. 60/055,940 filed Aug. 18, 1997.

FIELD OF THE INVENTION

The present invention relates to a cultivator tool. More particularly it relates to an integral seed boot which can be attached to a cultivator shank. The seed boot comprises a front mounting bracket, to which a sweep may be attached, a tubular seed boot member, through which seed may be delivered, and a rear mounting bracket, to which a knife and nutrient tube may be attached.

BACKGROUND OF THE INVENTION

It is conventional in the cultivator tool art to provide a "C"-shaped, spring steel shank having mounting bolt holes extending therethrough at its lower end. A sweep or shovel is bolted directly to the front of the shank at its lower end. A separate tubular seed boot is bolted to the rear of the shank. The seed boot is the end piece to which a seed tube is attached, for depositing seed into the furrow formed by the sweep.

It is also known to provide a rearwardly extending mounting bracket on the seed boot, to which a knife and tubular fertilizer boot assembly may be attached. A delivery tube can be attached to the fertilizer boot to deposit fertilizer or the like in the furrow opened by the knife.

It is further known to weld a spreader to the inner surface of the seed boot at its outlet, to disperse the seed in a desirable pattern.

This overall assembly is commonly referred to as "a double shoot opener".

There are problems associated with this assembly. More particularly:

the C-shaped shank is known for causing trash to climb its front edge and form cohesive lumps which are left on the ground and which later must be dispersed;

the bolt holes in a C-shaped shank are located at the operating level where the sweep is working. As a result, the nut and bolt assembly attaching the sweep to the shank becomes worn due to contact with the soil. This makes it difficult to undo the nuts when changing out the sweeps. In most cases, the user has to cut off the nuts using a torch. When the many sweeps present on a cultivator are being changed out, this disassembly consumes considerable time and labor;

as previously stated, the spreader is welded to the seed boot and thus cannot be easily changed to vary the seed drop pattern;

multiple parts need to be kept in stock; and the prior art assemblies are not very sturdy.

A known alternative to the C-shaped shank is the edge-on shank. It has a vertical lower end and thus is less likely to induce trash accumulation.

The present invention is directed to providing a seed boot which is designed for use with an edge-on shank and which improves on the disassembly, sturdiness and spreader problems previously mentioned.

SUMMARY OF THE INVENTION

The concept of the invention is to provide a single casting operative to:

carry a ground opener (for example, a sweep) at its forward lower end;

attach at its upper end to an edge-on shank;

form a seed boot having a passageway for delivering seed; and preferably support a second opener, (for example, a knife), and a nutrient boot, for the delivery of fertilizer or the like, at its rear end.

More particularly, a seed boot is provided which, in its preferred form, comprises:

A front mounting bracket for bolting to the shank. The bracket has at least one transverse bolt hole through which a nut and bolt assembly may extend to attach the sweep. The bolt hole is located sufficiently high so that the nut and bolt assembly is isolated from significant contact with the erosive soil;

A seed boot member integral with the front mounting bracket. The seed boot member is sufficiently sturdy so that a spreader can optionally be bolted thereto. The spreader can therefore be changed if desired; and A rear mounting bracket projecting rearwardly from the seed boot member and being integral therewith, the rear mounting bracket having at least one bolt hole so that a knife and nutrient tube boot assembly may be attached thereto and supported thereby.

The seed boot incorporating all of these features is characterized by the following advantages:

it is designed to be used with an edge-on shank, thereby reducing the trash accumulation problem;

the bolt and nut assembly securing the sweep to the front bracket is not subjected to severe wear and can be disassembled with wrenches;

the spreader, if used, can be changed; and a single part replaces what used to involve an assembly of parts, this structure being sturdier than the assembly of prior art parts.

Broadly stated, the invention is a steel seed boot for attachment to an edge-on cultivator shank, comprising: a tubular seed boot member forming a seed passageway having an upper inlet and a lower outlet, the boot member having a lower end; a front bracket projecting forwardly from the seed boot member, the front bracket including upper and lower ends, the bracket upper end forming transverse bolt hole openings extending therethrough for attachment of the bracket to the shank with a nut and bolt assembly, the bracket lower end forming transverse bolt hole openings for attachment to a sweep with a nut and bolt assembly; and a rear bracket projecting rearwardly from the seed boot member, the rear bracket having transverse bolt hole means for attachment to a knife and nutrient boot member, the seed boot being formed as a single integral casting.

DESCRIPTION OF THE PREFERRED EMBODIMENT

Figure 1:
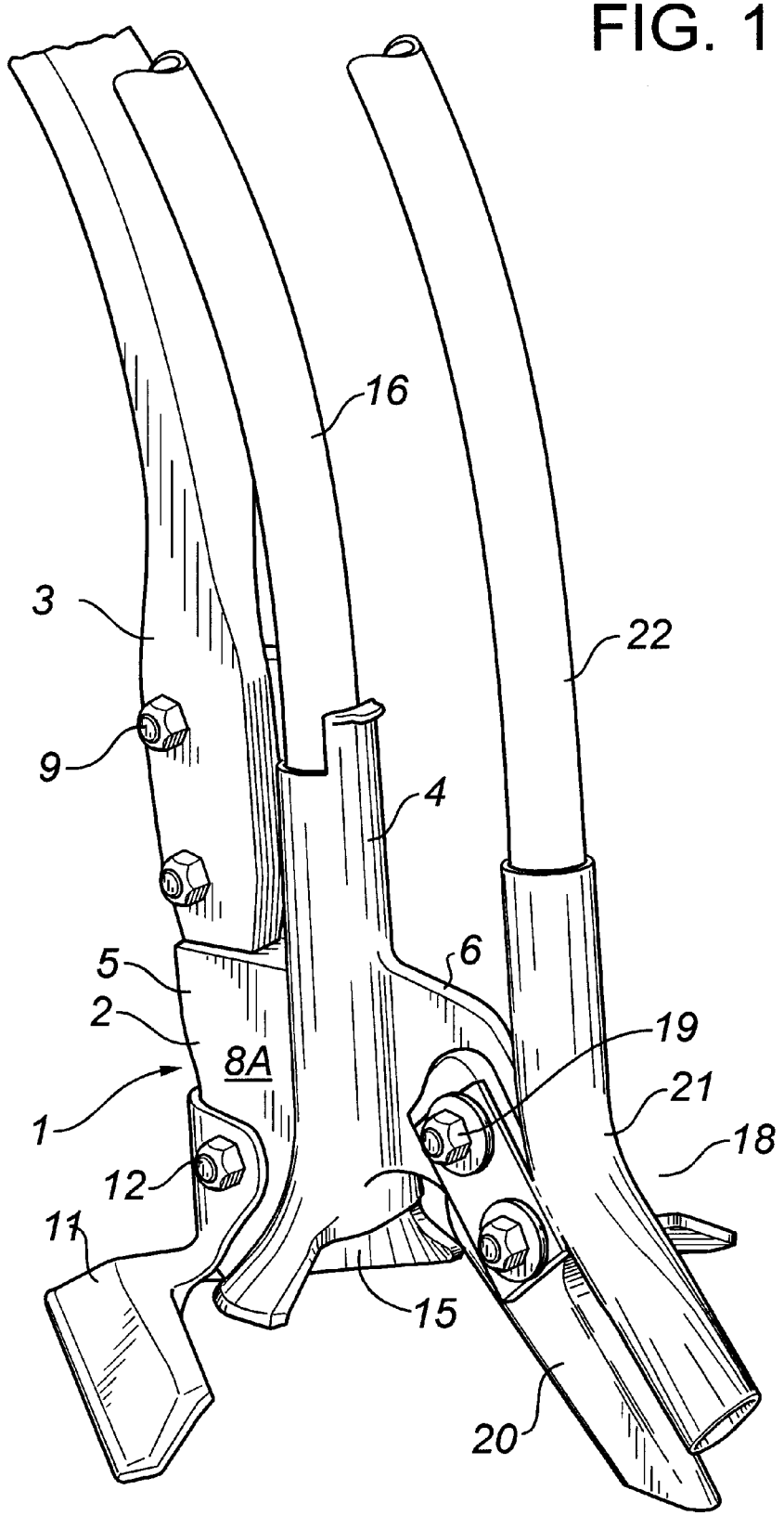
FIG. 1 is a perspective view showing the cultivator tool.
Figure 2:
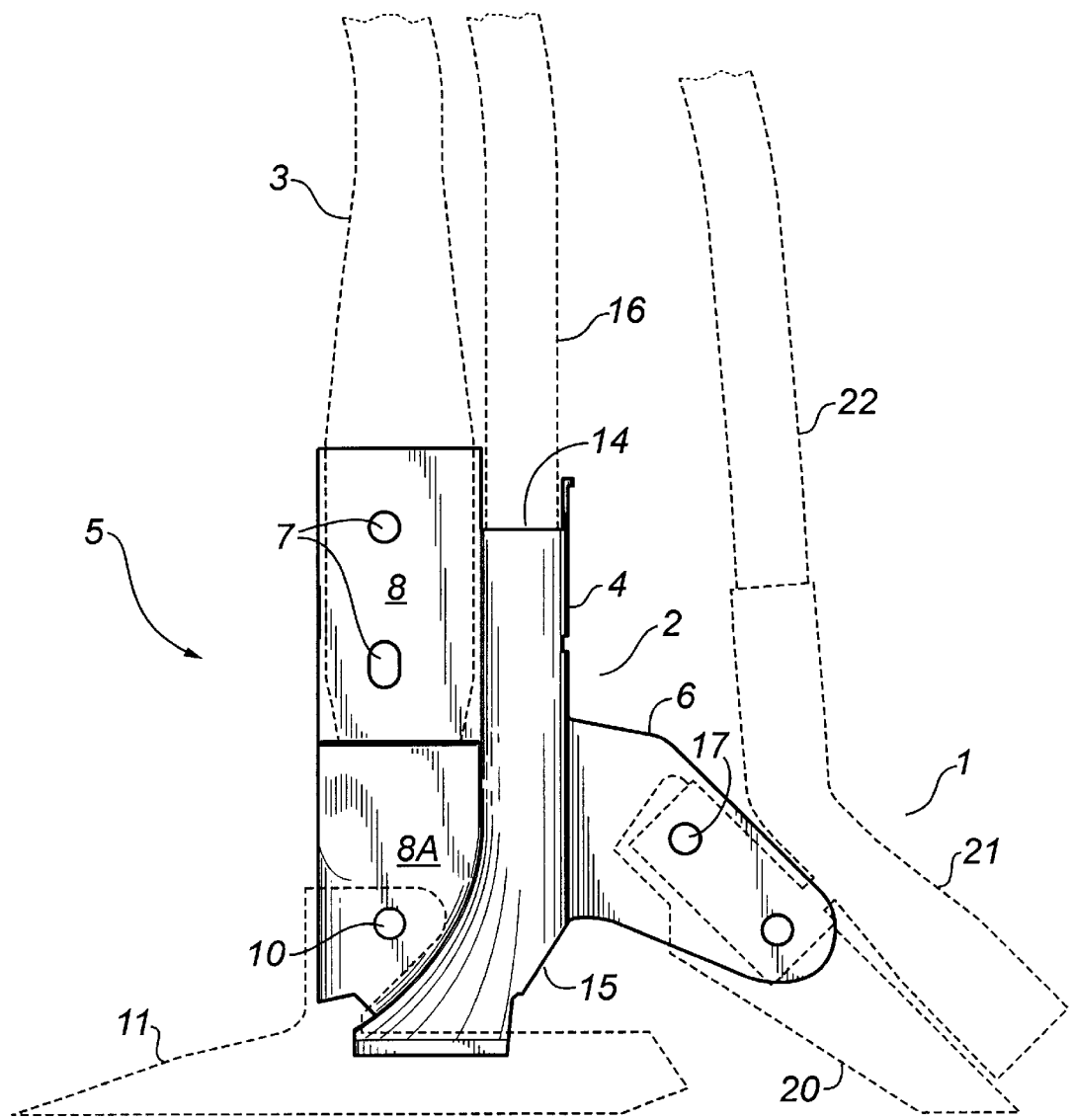
FIG. 2 is a side view showing the seed boot with shank, sweep and feed tubes shown in dotted lines.
Figure 3:
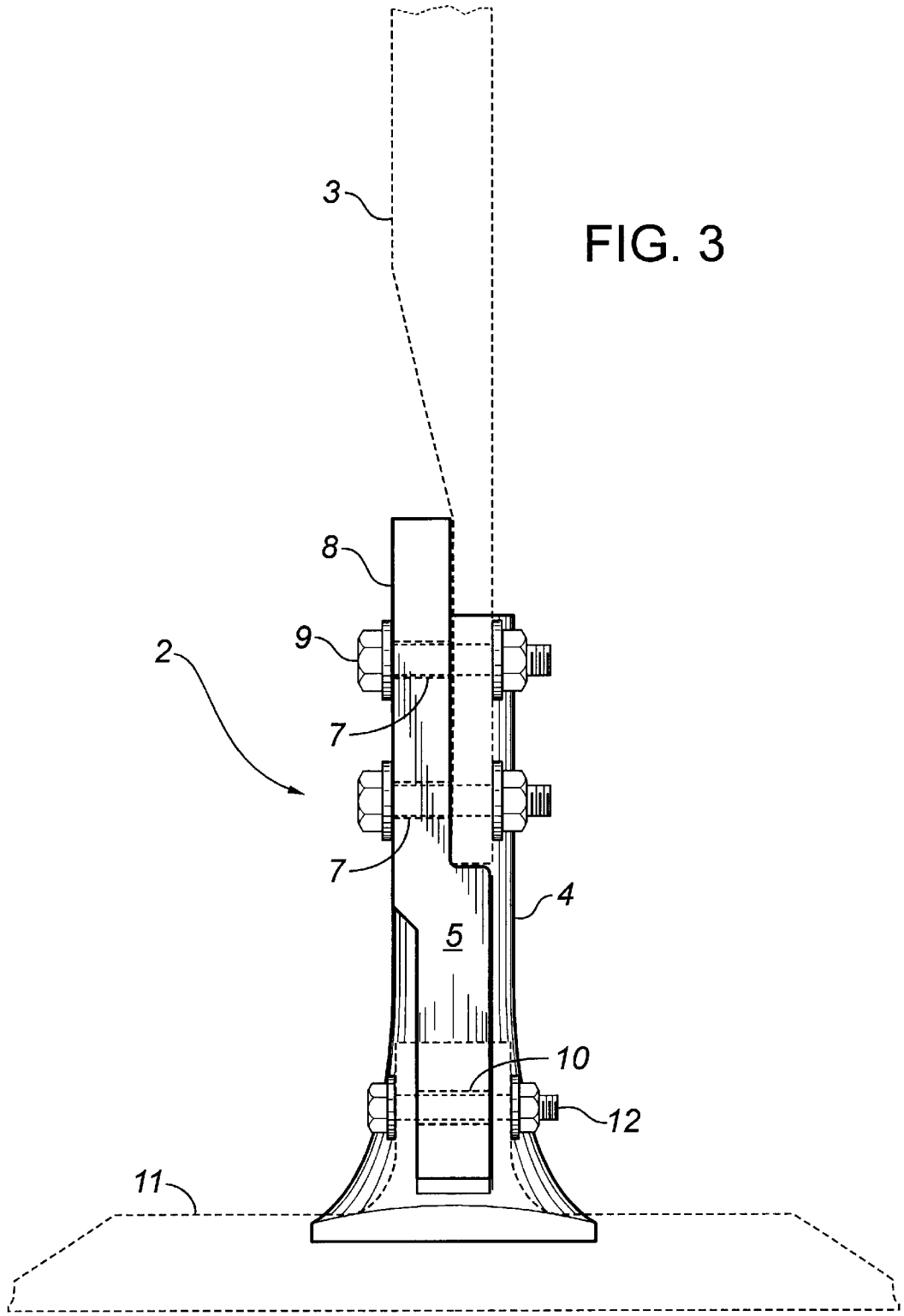
FIG. 3 is a front view showing the seed boot bolted to a shank and sweep which are shown in dotted lines.
Figure 4:
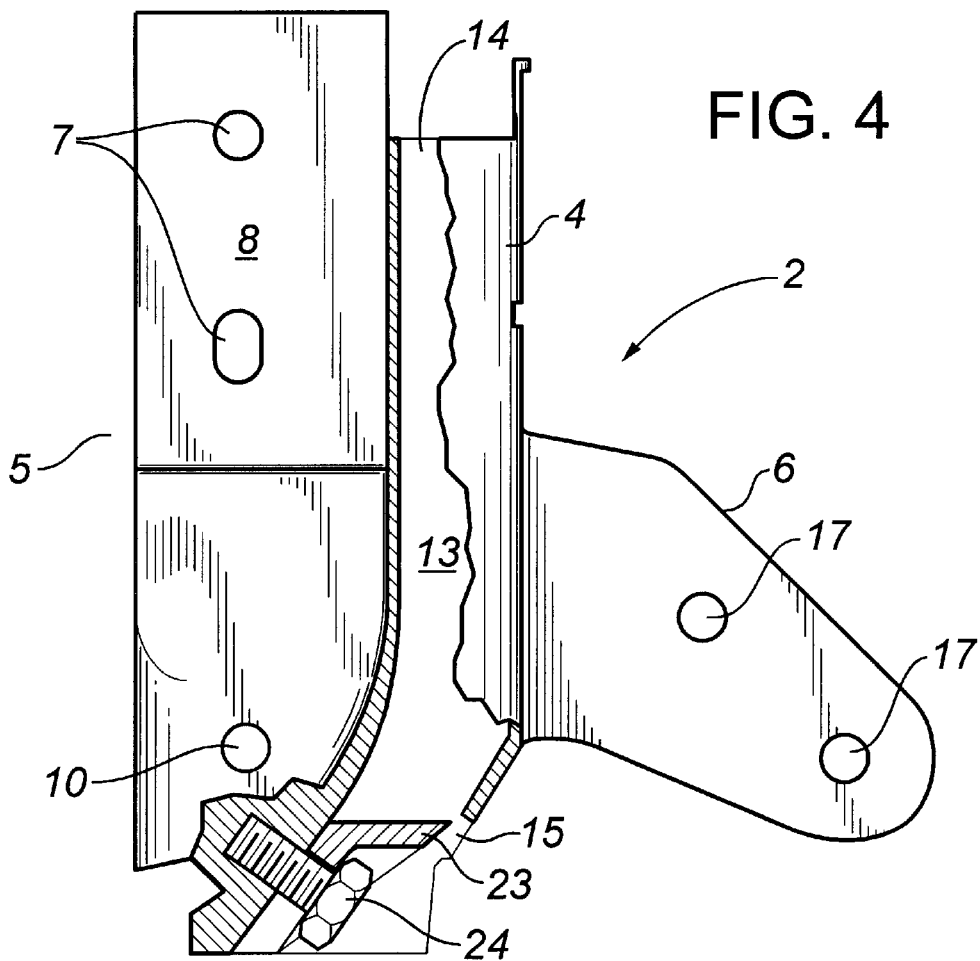
FIG. 4 is a side view, partly broken away, of the seed boot, showing a spreader mounted thereto.
Figure 5:
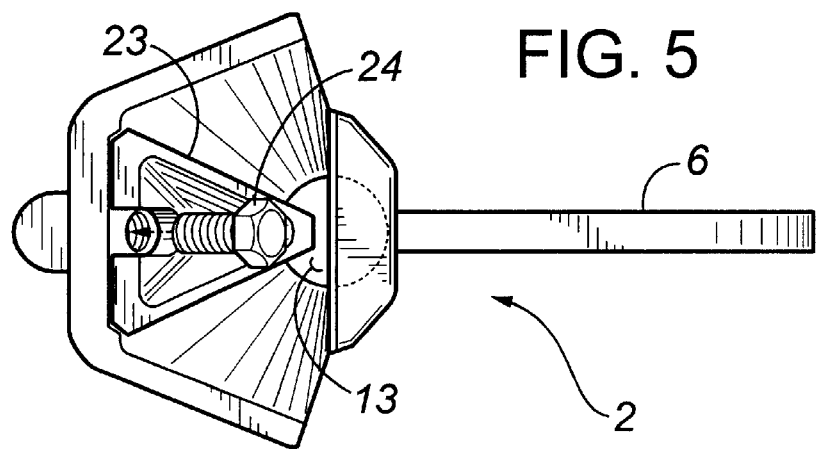
FIG. 5 is a bottom view of the seed boot, showing the spreader bolted in place.

The cultivator tool 1 comprises a seed boot 2 mounted to the lower end of an edge-on cultivator shank 3.

The seed boot 2 comprises a tubular seed boot member 4 having front and rear brackets 5,6 projecting therefrom. The seed boot member 4 and brackets 5,6 are cast or otherwise formed as a single steel part.

The front bracket 5 has transverse bolt holes 7 at its upper end 8, for connection by nut and bolt assemblies 9 with the shank 3. A transverse bolt hole 10 extends through the front bracket 5 at its lower end 8a. A sweep 11 is attached to bracket 5 by a nut and bolt assembly 12 extending through the bolt hole 10.

The seed boot member 4 forms a longitudinal passageway 13 extending therethrough and having an inlet 14 at its upper end and an outlet 15 at its lower end. The seed boot member 4 is connected at its inlet 14 with a seed tube 16 so that seed may be delivered through the outlet 15 into the furrow formed by the sweep 11.

The rear bracket 6 forms bolt holes 17. An opener and nutrient boot assembly 18 is connected by nut and bolt assemblies 19 to the rear bracket 6. The assembly 18 provides a knife 20 for opening a furrow and a fertilizer boot 21 for delivering fertilizer to the furrow opened by the knife. The fertilizer boot 21 is connected with a fertilizer feed tube 22.

A spreader 23 is attached by bolt 24 with the seed boot member 4 at its outlet 15. The spreader 23 functions to disperse seed dropping out of the passageway 13.

The scope of the invention is defined by the following claims.

The embodiments of the invention in which an exclusive property or privilege is claimed are defined as follows:

1. A steel seed boot for attachment to an edge-on cultivator shank comprising:

a tubular seed boot member forming a seed passageway having an upper inlet and a lower outlet, said boot member having a lower end;

a front bracket projecting forwardly from the seed boot member, said front bracket having upper and lower ends, said front bracket upper end forming transverse bolt hole means extending therethrough for attachment of the bracket to the shank with a nut and bolt assembly, said bracket lower end forming transverse bolt hole means for attachment to a sweep with a nut and bolt assembly; and a rear bracket projecting rearwardly from the seed boot member, said rear bracket having transverse bolt hole means for attachment to a knife and nutrient boot member;

said seed boot being formed as a single integral casting.

2. The seed boot as set forth in claim 1 comprising:

a spreader bolted to the lower end of the seed boot member, said spreader being positioned in the seed boot member outlet, for dispersing seed.

3. A cultivator tool comprising:

an edge-on cultivator shank having a lower end and at least one transverse bolt hole formed on its lower end:

a steel seed boot attached by a nut and bolt assembly to the cultivator shank's lower end;

the seed boot comprising a tubular seed boot member forming a seed passageway having an upper inlet and a lower outlet;

a front bracket projecting forwardly from the seed boot member, said front bracket including an upper end, a lower end, and having transverse bolt hole means formed on its upper end through which the nut and bolt assembly extend, and transverse bolt hole means formed on its lower end;

a sweep attached to the seed boot by a nut and bolt assembly extending through the front bracket lower end bolt hole means;

said seed boot being formed as a single integral metal casting;

wherein the seed boot comprises a rear bracket projecting rearwardly from the seed boot member, said rear bracket having at least one transverse bolt hole means; and, an opener and nutrient seed boot assembly is mounted to the rear bracket by at least one nut and bolt assembly extending through the rear bracket bolt hole means.

4. The cultivator tool as set forth in claim 3 comprising:

a spreader bolted to the seed boot member, said spreader being positioned in the seed boot member outlet, for dispersing seed.

* * * * *